United States Patent [19]

Giordano et al.

[11] 4,283,431

[45] Aug. 11, 1981

[54] METHOD OF MAKING A MULTI-LAYER PIZZA TYPE PRODUCT

[76] Inventors: Gene Giordano; Flora Giordano, both of 1226 Taylor Ave., Arnold, Md. 21012

[21] Appl. No.: 47,687

[22] Filed: Jun. 12, 1979

[51] Int. Cl.³ ............................................. A21D 13/00
[52] U.S. Cl. ..................................... 426/296; 426/94; 426/275; 426/302
[58] Field of Search ................. 426/94, 549, 496, 275, 426/302, 292, 296

[56] References Cited

U.S. PATENT DOCUMENTS

| | | | |
|---|---|---|---|
| 3,615,678 | 10/1971 | Tangel et al. | 426/94 |
| 3,615,679 | 10/1971 | Tangel et al. | 426/94 |
| 3,753,733 | 8/1973 | Bell | 426/275 |

Primary Examiner—Joseph M. Golian
Assistant Examiner—Elizabeth J. Curtin
Attorney, Agent, or Firm—Scrivener, Clarke, Scrivener and Johnson

[57] ABSTRACT

The invention is concerned with making a multi-layer pizza type product wherein, instead of a single pastry layer, two pastry layers are provided with a layer of ingredients over the second pastry layer. The method includes adding as a final layer over a first prebaked pastry layer, a layer of cheese, then stretching over this a layer of unbaked dough, partially baking the layers, adding a layer of ingredients to the upper surface of the partially baked pastry layer, and then baking the entire assembly at a specified temperature for a specified period of time until done.

3 Claims, No Drawings

METHOD OF MAKING A MULTI-LAYER PIZZA TYPE PRODUCT

This invention relates to a baked pizza type product and more particularly to a method of making double-layered pizza type product.

Conventional pizzas fall into one of three categories: single layer thin, single layer thick or Sicilian, and single layer deep dish. Thus, in all known pizzas there is but a single layer of pastry and a single layer of ingredients.

The object of the present invention is to produce a double-layer pizza type product.

The double-layer construction of the present invention is unique in that the amount of dough involved in the base layer and second layer, the oven degree setting, the baking time and the cooling time of the product are critical in order to obtain a palatable finished product. Elimination of one or more of the aforementioned steps would produce a product which would be uncooked or which would become burned or dried out in the baking process.

The applying of the cheese and any one or combination of the other ingredients, such as pepperoni, sausage, ground beef, mushrooms, onions and green peppers on top of the sauce in the middle section of the double-layered product of the invention (it is extremely critical that cheese be on top of the mixture) insures a moist texture which prevents dryness as is found in regular pizza-type products; especially when they are allowed to remain at room temperature, even for a short period of time after being cooked.

In accordance with the invention the foregoing object is achieved by first applying over a layer of pizza ingredients in a pre-baked pastry shell a layer of cheese, and over this an uncooked pastry layer, subjecting these layers to a predetermined baking temperature for a predetermined period of time until partially baked, then applying to the upper surface of the partially baked upper layer a second layer of pizza ingredients, and thereafter subjecting all of the layers to a predetermined baking temperature until the product is done.

The invention will now be described in detail, and by way of example it will be described in connection with a 12 inch pizza type product.

As the initial step, a 12 inch pre-baked pastry shell is provided. This can be prepared by rolling out 8 ounces of fresh dough approximately ¼inch thick and baking the same for about 5 minutes at 475°. After cooling, a tomato sauce may be applied evenly over the surface of the shell. The sauce preferably comprises 107 viscosity tomato puree, tomato in heavy puree, oregano, salt and pepper. Thereafter there is distributed over the surface of the sauce 8 ounces of blended cheese consisting of 2 parts skim milk mozzarella to 1 part of 2 percent provolone cheese.

If desired, prior to to the addition of the cheese layer, layers of other ingredients can be distributed over the sauce. For example, successive layers of one or more of the following can be added for a 12 inch pizza type product produced in accordance with the method of the invention: 4 ounces of meatballs, 4 ounces of Italian pork sausage, 2½ ounces of pepperoni and 3 ounces of mushrooms. Regardless of how many layers or what kind of ingredients are used, in accordance with the invention the final layer of ingredients in the first pre-baked pastry shell must consist of cheese, and preferably the mixture of mozzarella and provolone cheeses described above.

Following the foregoing, a second layer of pastry is prepared by rolling out 8 ounces of fresh dough to a size which can be stretched over the entire surface of the ingredients so far added to the first pastry shell, and contiguous to the layer of cheese mixture.

The second pastry layer is punched several times to allow for the escape of heat and, in accordance with the invention, the two pastry layers with the layers of ingredients there-between are partially baked at 550° F. for 4 minutes, after which the partially baked product is allowed to cool for 5 minutes. A layer of sauce of the type which was initially applied to the first pre-baked shell may then be applied evenly over the second partially baked layer of dough and over the sauce layer cheese is applied which may be 2 tablespoons of grated romano cheese followed by 6 ounces of shredded mozzarella-provolone cheese mixture. As the final step in making the finished product, the entire assembly is baked at 550° F. for about 8 minutes which is the time and temperature required to completely bake the product including the second layer of pastry. This layer, due to its initial partial baking in contact with the cheese layer, followed by complete baking between the cheese and upper ingredient layers, retains a moist texture, never tastes burned, and does not dry out after prolonged exposure, up to 18 hours, to room temperature. Ordinary pizzas, on the other hand, dry out to the point of unpalatability after only a short period of exposure to room temperature. It will be apparent that the invention may be varied in certain respects without, however, departing from the scope and spirit of the appended claims.

What is claimed is:

1. The method of making a double-layered pizza type product comprising the steps of applying at least one layer of ingredients, which includes tomato sauce, to a pre-baked pastry layer, distributing over said layer of ingredients a layer of cheese comprising a blend of mozzarella and provolone cheese, stretching a second layer of rolled out, unbaked pastry over the entire surface of said layer of cheese, partially baking the two pastry layers with the said at least one layer of ingredients and the layer of cheese there-between, allowing the foregoing layers to cool, applying to the upper surface of the second layer of pastry a layer of ingredients, and then baking the entire assembly until done.

2. The method of claim 1 wherein the partial baking step is done at about 550° F. for about four minutes, the layers cooled for about five minutes and the final baking step is at about 550° F. for about eight minutes.

3. The method of claim 1 wherein the layer of ingredients applied to the upper surface of the second shell includes a tomato sauce.

* * * * *